United States Patent [19]

Schuck

[11] 4,209,071
[45] Jun. 24, 1980

[54] CONTROL MECHANISM FOR SKID STEER VEHICLE

[75] Inventor: Paul R. Schuck, Davenport, Iowa

[73] Assignee: J. I. Case Company, Racine, Wis.

[21] Appl. No.: 901,688

[22] Filed: May 1, 1978

[51] Int. Cl.² ............................................. B62D 11/02
[52] U.S. Cl. .................................................. 180/6.48
[58] Field of Search ............................. 180/6.2, 6.48; 74/471 R, 513

[56] References Cited

U.S. PATENT DOCUMENTS

| 2,236,145 | 3/1941 | Kolb | 74/513 |
| 3,563,109 | 2/1971 | Glass | 180/6.48 |
| 3,771,310 | 11/1973 | Cryder | 180/6.48 |
| 3,938,401 | 2/1976 | Bauer | 74/471 R |
| 4,009,678 | 3/1977 | North | 74/471 R |

Primary Examiner—John J. Love
Assistant Examiner—Randall A. Schrecengost
Attorney, Agent, or Firm—Dressler, Goldsmith, Shore, Sutker & Milnamow, Ltd.

[57] ABSTRACT

A control mechanism for a vehicle that has two separate ground engaging members on opposite side of a body with fluid motors driving the ground engaging members and fluid pumps supplying pressurized fluid to the motors and where the control means includes separate individual controls for the respective pumps to control the direction and amount of fluid flow and a separate control for simultaneously varying the output speed of both fluid motors simultaneously.

4 Claims, 4 Drawing Figures

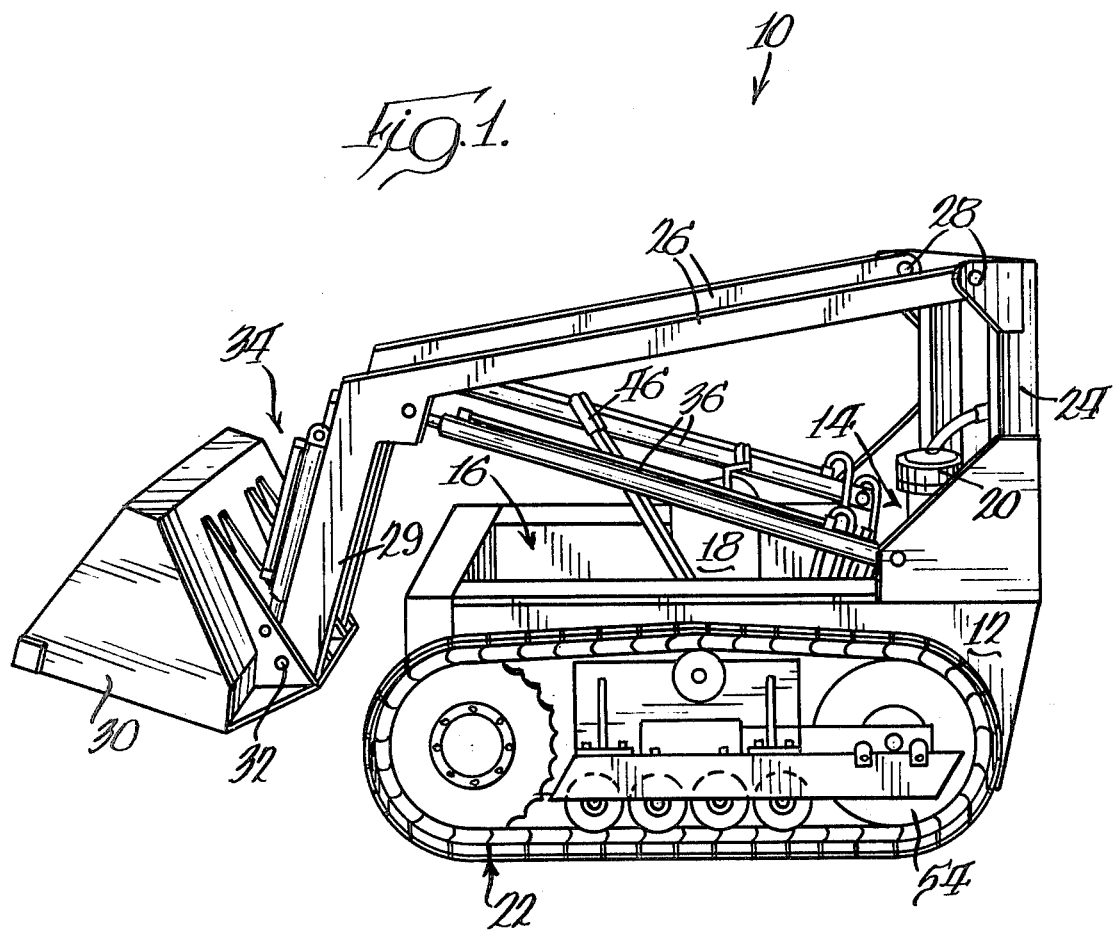
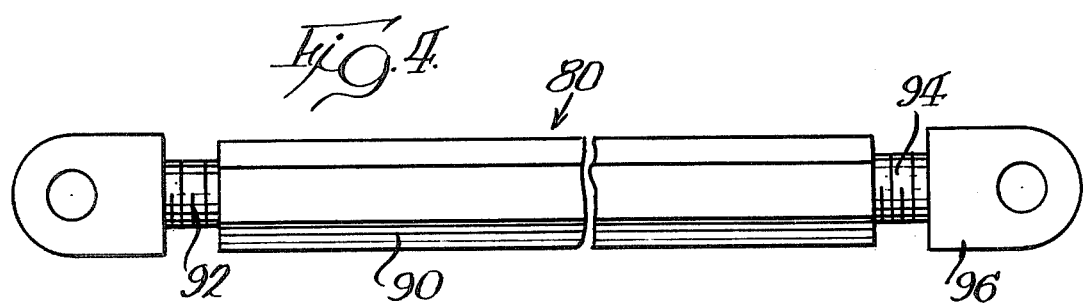

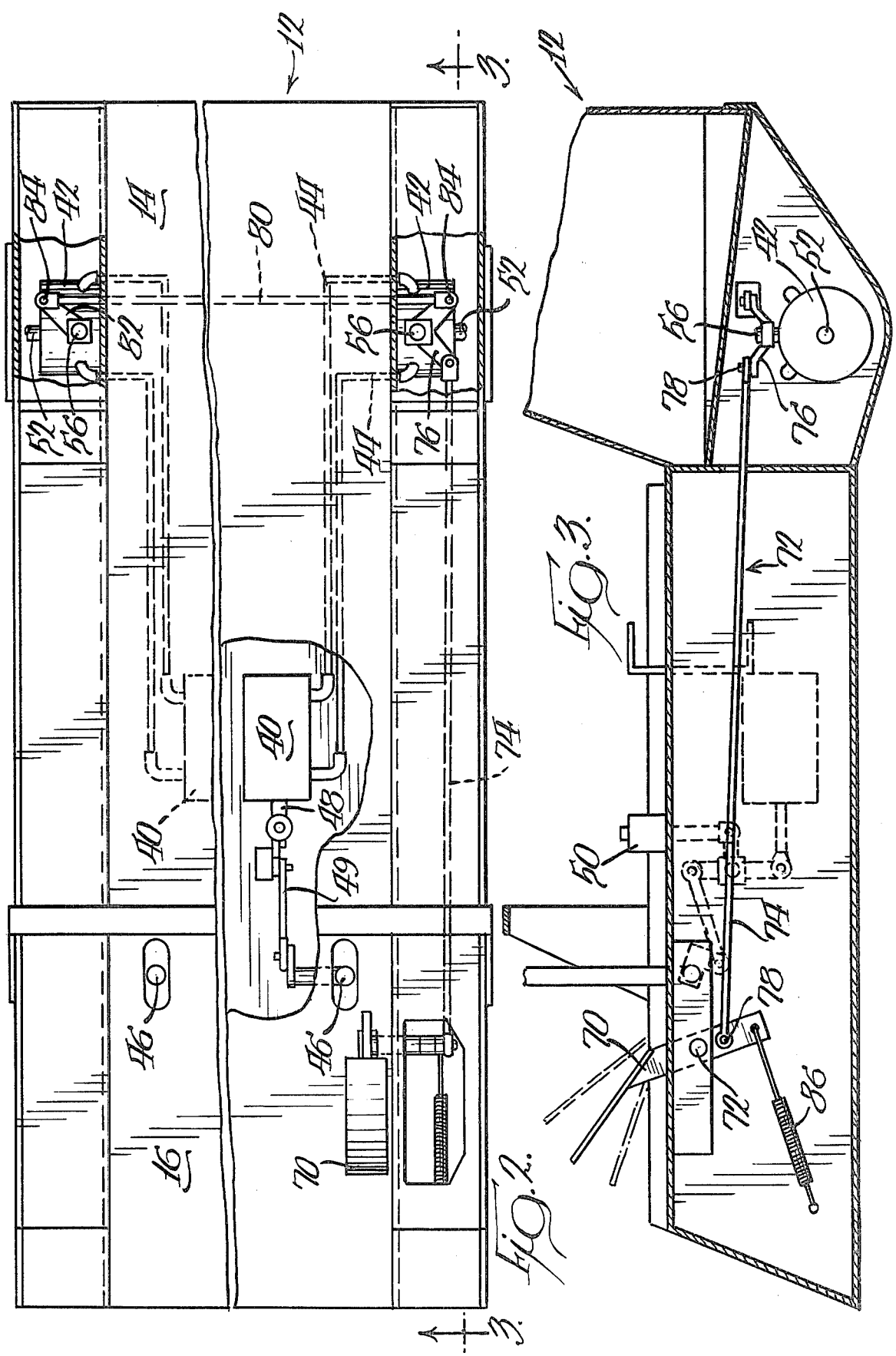

CONTROL MECHANISM FOR SKID STEER VEHICLE

BACKGROUND OF THE INVENTION

Numerous vehicles of the track or wheel type to perform various material handling operations have been proposed. One type of vehicle that recently has received a remarkable degree of attention is a small unit that incorporates four wheels which are driven by two separate power sources and the steering or turning movement is accomplished by driving the pair of wheels on one side of the vehicle in one direction while the second pair of wheels are either in a neutral condition or driven at a reduced speed or in the opposite direction. These vehicles have generally been referred to as skid steer vehicles.

One such type of vehicle that has been commercially accepted includes a hydraulic drive system for driving the respective wheels. Usually the drive system includes a pair of pumps that are driven by the engine or propulsion unit and a pair of hydraulic motors that are respectively operatively connected to the two pairs of wheels on opposite sides of the vehicle.

In order to control the speed and the direction of movement of the vehicle, it has been customary to utilize a variable displacement reversible pump cooperating with a fixed displacement motor for each pair of wheels and the output of the pumps is controlled by separate manual control mechanisms, such as control levers. Such type of system is disclosed in U.S. Pat. No. 4,030,560 which is assigned to the assignee of the present invention.

Another type of hydraulic circuit for driving vehicles of this type is disclosed in U.S. Pat. No. 3,870,172 wherein fixed displacement dual gear pumps are driven by an engine and respectively have a constant output which is supplied to left and right-hand motors and the control includes valves incorporated in the circuit between the pumps and the motors which will again control the speed and direction of the vehicle by controlling the speed and direction of the output shafts of the variable speed motors.

Presently, the assignee of the present invention is commercially manufacturing various sizes of machines all of which include a tandem pump assembly including two variable displacement pumps and two fixed displacement piston motors with the variable displacement pumps being respectively controlled by manual control levers in the operator's station. Thus, by movement of the respective control levers for driving the ground engaging members on opposite sides of the vehicle, the speed and direction of the vehicle can be controlled. While such a unit has been accepted in the marketplace, manufacturers are constantly striving to increase the versatility of such vehicles and also maintain or reduce the cost thereof.

In this respect, it has recently been proposed to convert a wheeled type vehicle of the type shown in the above-mentioned patents to a crawler type vehicle to increase the flotation and tractive efforts for the vehicle in certain operating conditions.

One other area that has received a substantial amount of attention is the versatility of the speed of the vehicles. Because of the compact nature of the machine and the competitive selling price thereof, manufacturers are to some extent limited by the size and complexity of the pumps which can be incorporated into the unit to drive the vehicle. This factor has to some extent limited the versatility of the vehicle because competitively priced pumps have limitations respecting the variations in outputs of the unit. This in turn limits the maximum speed of the vehicle to something less than four miles per hour. This factor significantly impedes the efficiency of a machine of this type, particularly when it is being utilized for hauling loads a substantial distance.

SUMMARY OF THE INVENTION

According to the present invention, the versatility of a crawler or wheeled type skid steer vehicle is substantially increased by utilizing a pair of variable displacement motors in conjunction with a pair of variable displacement pumps and providing separate controls for the pumps and the motors.

More specifically, the control system is designed to cooperate with a vehicle that has a body and first and second ground engaging members on opposite sides of the body driven by a pair of variable displacement fluid motors that respectively have output shafts connected to the ground engaging members. First and second reversible variable displacement pumps are driven by an engine and are hydraulically connected to the respective fluid motors and a control lever cooperates with each of the pumps to vary the output flow and the direction from the pumps to the respective motors. The control system also includes a control mechanism attached to the respective motors for simultaneously varying the speed of the output shafts of the fluid motors.

With this arrangement, the direction for a vehicle can be set by the manual control levers and also a given speed. Additional variations can then be made utilizing the control mechanism which preferably consists of a foot pedal that is connected to both variable displacement motors through a simple linkage system that can be readily adjusted.

BRIEF DESCRIPTION OF THE SEVERAL VIEWS OF THE DRAWINGS

FIG. 1 illustrates a perspective view of a vehicle which may have the present invention incorporated therein;

FIG. 2 is an enlarged fragmentary plan view of selected portions of the drive train for the vehicle;

FIG. 3 is a vertical section as viewed generally along line 3—3 of FIG. 2; and

FIG. 4 is a fragmentary enlarged sectional view showing the linkage connection between the fluid motors.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows a vehicle, generally designated by reference numeral 10 which consists of a frame structure and body 12 defining an engine space 14 at the rear end thereof and an operator's space 16 adjacent the forward end thereof. A seat 18 is located intermediate the forward space 16 and engine space 18 while an engine 20 is located in the engine space at the rear end of the vehicle. Body 12 is supported by first and second ground engaging members 22 (only one being shown) which have been illustratively shown as crawler track chain units. However, the invention has equal applicability to wheel units of the type shown in the above-mentioned patents.

Vehicle 10 further includes first and second stanchions 24 that project upwardly from opposite sides of the body 12 adjacent the rear end and on opposite sides of engine space 14. The pair of lift arms 26 are respectively pivoted by pins 28 on the upper ends of stanchions 24 and extend forwardly along opposite sides of spaces 14 and 16. Lift arms 26 have front portions 29 which extend downwardly directly adjacent the front end of body 12. A material handling unit 30 is pivoted on the lower free ends of the arms through pins 32 and is pivoted through fluid motors 34. Lift arms 26 are adapted to be raised and lowered through a pair of fluid rams 36 that are interposed between vehicle body 12 and the forward ends of the arms. Material handling unit 30 may take a variety of form such as a bucket, scoop, dozer blade, fork lift, etc.

The drive system for propelling the respective tracks on opposite sides of the vehicle is schematically illustrated in FIG. 2 and includes first and second variable displacement pumps 40 respectively connected to variable displacement motors 42 through conduits 44. The respective pumps 40 are driven by engine 14 and are connected to a reservoir (not shown) to provide pressurized fluid output to the respective fluid motors. The amount of fluid flow and the direction thereof through conduits 44 is controlled by a pair of control levers 46 which are respectively interconnected with the control elements 48 of pumps 40 through linkages 49. Since the respective linkages form no part of the present invention, the detailed description thereof does not appear to be necessary. However, it should be noted that each control lever is normally biased to a position which corresponds to a neutral position for a given pump 40 through a biasing mechanism 50. Thus, the speed and direction of the respective crawler tracks can be controlled by proper manipulation of the respective control levers so that the output of each of the individual pumps 40 supplies varying amounts of fluid flow to the respective motors. Preferably, pumps 40 are of the infinitely variable type in either the forward or reverse direction and are commercially available pumps sold by Cessna Fluid Power, a Division of Cessna Aircraft, Wichita, Kansas, and designated as Model No. 78442.

As indicated above, normally the fluid motors 42 that are associated with variable displacement pumps 40 are of the fixed displacement type and may be of the piston type to decrease the cost thereof. However, such an arrangement has the inherent limitation of having the maximum speed of the vehicle entirely dependent upon the variations that can be incorporated into the variable displacement pumps. For example, the variable displacement pumps discussed above will limit the maximum speed of the vehicle to approximately 3½ miles per hour in the forward direction. This of course, places a substantial restriction on the amount of time that it is necessary for moving the vehicle for any large distances such as when moving from one job site to another or when transporting materials a substantial distance from the pickup site to the dump site.

According to the present invention, the fluid motors 42 are of the variable displacement type and have output shaft 52 which are connected to drive sprockets 54 respectively associated with each of the ground engaging members 22 preferably adjacent the rear end of the vehicle. Suitable gear reduction means may be interposed between shaft 52 and drive sprocket 54 such as the planetary drive mechanism illustrated in U.S. Pat. No. 3,861,481.

Each fluid motor 42 is preferably of a commercially available type sold by Cessna Fluid Power, a Division of Cessna Aircraft, Wichita, Kans., as a Model No. 71402, wherein the motor incorporates a swash plate (not shown), the angle of which controls the speed of output shaft 52. The swash plate is connected to a control shaft 56 and the angular position of the swash plate is determined by the rotational position of the control lever or shaft 56.

According to the present invention, the positions of the respective control shafts 56 for the respective motors 42 are simultaneously adjusted through a control mechanism so that the speeds of output shafts 52 are synchronized for both of the motors. Thus, as illustrated in FIGS. 2 and 3, the control mechanism consists of a single manual control member, in the form of a push or foot pedal 70 that is pivoted on a pin 72 defined on body 12 and is connected through a control linkage 72 to both shafts 56 of motors 42. Control linkage 72 consists of a first link 74 that extends from foot pedal 70 to one arm of a bell crank 76 through a ball and socket connection 78. Bell crank 76 is attached to control shaft 56 of the first motor 42 while the second arm of bell crank 76 is connected through a second link 80 to an arm 82 connected to shaft 56 of the second motor 42. The opposite ends of second link 80 again have ball and socket type connections 84.

A biasing spring 86 cooperates with the lower end of foot pedal 70 and normally biases linkage means 72 and foot pedal 70 to a position which corresponds to the lowest forward speed for the respective output shafts 52.

With the arrangement so far described, the operator can normally control the speed of direction and movement of vehicle 10 by manipulation of the respective control levers 46 during normal operation of the vehicle. This control would preferably be utilized exclusively in areas where the operator is manipulating in close quarters and the distance between a pickup site and a dumping site for a scoop or bucket is rather short. This would be the same type of control that is presently being utilized on most machines of this type wherein the operator is fully familiar with such operation. If, however, there is a need for moving the vehicle a substantial distance, the operator would set the control levers 46 for a maximum output of variable speed pumps 40 and then could substantially double the speed of the vehicle by utilizing foot pedal 70 and moving the pedal between the dotted line positions illustrated in FIG. 3. Whenever foot pedal 70 is released, biasing means 86 would automatically move the control shafts 56 to the lowest forward speed for the motor so that the lower speed control could be accomplished utilizing only control levers 46.

According to another aspect of the invention, the link 80 which interconnects motor shaft 56 is of a particular configuration and connected to bell crank 76 and arm 82 so that incremental adjustments can be made utilizing a standard open ended wrench without disconnecting or effecting any other components of the linkage. Thus, as illustrated in FIG. 4, control link 80 includes a rectangular or hexagonal bar 90 which cooperates at one end with a left-hand threaded adjustment member 92 and at the opposite end with a right-hand threaded adjustment member 94. The threaded members 92 and 94 respectively cooperate with clevises 96 that form part of the connections 84 between the respective arms 76 and 82. With this arrangement, incremental adjustments can be made to synchronize the movement of control shafts 56 merely by using an open ended wrench and rotating bar 90 in either direction to vary the effective length of the link 80 between bell crank 76 and arm 82.

As can be appreciated from the above description, the present invention substantially increases the versatility of a vehicle at only a very minimal increase in cost, which includes substitution of variable displacement motors for fixed displacement motors heretofore used and a simple control linkage between the respective motors and an operator's compartment for a vehicle.

What is claimed is:

1. In a vehicle having: a body with first and second ground engaging members on opposite sides of said body; an engine; first and second infinitely variable displacement fluid motors respectively having output shafts connected to said first and second ground engaging members to drive said members and respectively having a control element extending therefrom; first and second reversible variable displacement pumps for respectively supplying pressurized fluid to said motors; and control means for said motors and pumps, said control means including separate manual control members respectively cooperating with said variable displacement pumps for controlling the amount and direction of fluid flow from said pumps to respective motors, including means for setting said separate manual control members in a position corresponding to the maximum fluid flow output from said pumps to said motors driving said vehicle in the forward direction; and including a control mechanism cooperating with both of said motors for simultaneously varying the speed of both output shafts of said fluid motors, said control mechanism including: a first link of fixed length having one end universally connected to one of said control elements; a second link of fixed length having opposite ends respectively connected to the first link and the other of said control elements; a single manually operated actuating member connected to said first link; and means for mounting said actuating member on said body, said actuating member moving through a range of positions corresponding to the lowest to the highest speed settings of said motors, any one of said infinite number of speed settings of said motors being selected by the vehicle operator by locating said actuating member in a selected position corresponding to a desired speed setting of said motors, the speed of said vehicle being determined by said manual control members and said control mechanism.

2. A vehicle as defined in claim 1, in which said manual control members have the affect of setting the maximum fluid flow passing to said first and second fluid motors whereby said manual control members determine the lowest speed of said output shafts, said manual control mechanism having the effect of determining the highest speed of said output shafts.

3. A vehicle as defined in claim 1, in which said actuating member is a foot pedal said foot pedal being positioned by said vehicle operator in conjunction with said separate manual control members being set for maximum fluid flow output from said pumps to drive said vehicle in a forward direction.

4. A vehicle as defined in claim 1, in which said second link includes a bar with a left-hand threaded element at one end and a right-hand threaded element at the opposite end so that rotation of said bar varies the effective length of said second link, varying the length of said second link having the effect of synchronizing said first and second infinitely variable displacement fluid motors.

* * * * *